United States Patent [19]
Sekine et al.

[11] Patent Number: 6,051,077
[45] Date of Patent: Apr. 18, 2000

[54] RAW MATERIAL POWDER FOR MODIFIED PERMANENT MAGNETS AND PRODUCTION METHOD OF THE SAME

[75] Inventors: Shigenobu Sekine; Hiroji Sato, both of Tokyo, Japan

[73] Assignee: Sanei Kasei Co., Ltd., Tokyo, Japan

[21] Appl. No.: 08/893,991

[22] Filed: Jul. 16, 1997

[30] Foreign Application Priority Data

Jul. 17, 1996 [JP] Japan .................................... 8-187522

[51] Int. Cl.⁷ .................................................. H01F 1/057
[52] U.S. Cl. .......................... 148/105; 148/302; 75/255; 419/12
[58] Field of Search .............................. 75/255; 148/302, 148/101, 102, 103, 104, 105; 419/12

[56] References Cited

U.S. PATENT DOCUMENTS

| | | | |
|---|---|---|---|
| 4,601,875 | 7/1986 | Yamamoto et al. | 419/23 |
| 4,802,931 | 2/1989 | Croat | 148/302 |
| 5,443,617 | 8/1995 | Takahashi | 75/254 |
| 5,478,409 | 12/1995 | Takahashi | 148/104 |
| 5,569,333 | 10/1996 | Takahashi | 148/105 |
| 5,728,232 | 3/1998 | Takahashi | 148/105 |

*Primary Examiner*—John Sheehan
*Attorney, Agent, or Firm*—Pillsbury Cushman & Sutro

[57] ABSTRACT

The present invention is directed to provide a raw material powder for modified permanent magnets capable of enhancing magnetic properties of iron.rare earth element metal.boron permanent magnets and reducing the production cost, and further to provide its production method. The raw material powder is a pulverized powder of sintered mass obtained by sintering in vacuum or in a non-oxidative gas a mixture of an acicular iron powder and an alloy powder containing iron, a rare earth element metal and boron.

3 Claims, 2 Drawing Sheets

RAW MATERIAL POWDER FOR MODIFIED PERMANENT MAGNETS AND PRODUCTION METHOD OF THE SAME

BACKGROUND OF THE INVENTION

1. Field of the Invention

The present invention relates to a raw material powder for modified permanent magnets superior in magnetic properties, and to a process for producing the raw material powder.

2. Description of the Prior Art

Permanent magnets containing iron and rare earth element metals, especially rare earth element metal.iron.boron permanent magnets, are praised for their superior magnetic properties. JP-B-61-34242 discloses magnetically anisotropic sintered magnets having Fe-B-Nd components. The production method includes preparing a cast alloy containing the above components, pulverizing the cast alloy and molding-sintering the alloy powder, for which pulverization of the cast alloy costs much.

SUMMARY OF THE INVENTION

The present invention is directed to provide a raw material powder for modified permanent magnets capable of enhancing magnetic properties of iron.rare earth element metal-boron permanent magnets and reducing the production cost, and further to provide its production method.

A raw material powder for modified permanent magnets according to the present invention comprises a pulverized powder of sintered mass obtained by sintering in vacuum or in a non-oxidative gas a mixture of an acicular iron powder and an alloy powder containing iron, a rare earth element metal and boron. And the process of producing a raw material powder for modified permanent magnets comprises steps of mixing an alloy powder containing iron, a rare earth element metal and boron with an acicular iron powder; sintering the resulting powdery mixture in vacuum or in a non-oxidative gas; and pulverizing the resulting sintered mass.

DESCRIPTION OF THE PREFERRED EMBODIMENTS

Figure 1:
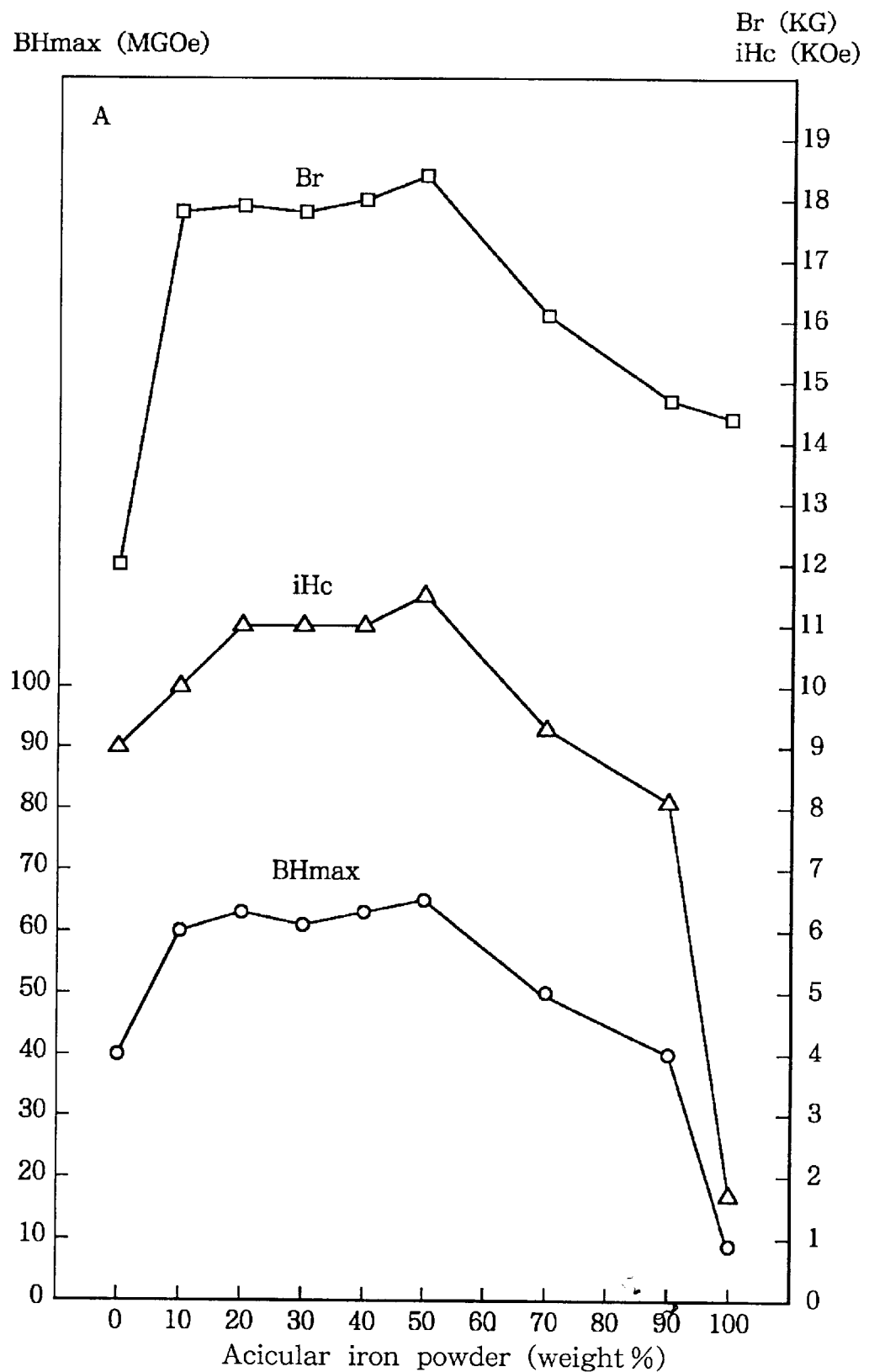
FIG. 1 is a graph showing magnetic properties of a sintered magnet prepared from a pulverized powder of sintered mass obtained by sintering a mixture of alloy powder A and an acicular iron powder.

The alloy powder containing iron, a rare earth element metal and boron used for the present invention may be any alloy powder of known composition capable of exhibiting strong magnetism when formed into sintered magnets or bonded magnets. As for the rare earth element metal (referred to as RE), neodium (Nd) and praseodymium (Pr) are praised. As for the alloys are included Fe.RE.B system and Fe.RE.B.C system, and alloys containing further at least one component selected from Ti, V, Cr, Mn, Ni, Zr, Nb, Mo, Hf, Ta, W, Pd, Ag, Pt, Au, Al, Cu, Ga, In, Sn, Sb, Pb, Bi, Zn, P, Si, Ge and S are known. The alloy powder is obtainable by preparing firstly an alloy of desired composition and then pulverizing the alloy mechanically or by hydrogen-disintegration methods, though commercially available products can be used. In either case, magnetic properties of magnets using the alloy powder are improved when the alloy powder is used after it is mixed with an acicular iron powder, the mixture is sintered, and the sintered mass is pulverized. The alloy powder preferably has an average particle size of micron ($\mu$m) order.

The acicular iron powder is obtained by reducing FeOOH (goethite) with hydrogen under hydrogen atmosphere heated at 300–500° C. An acicular iron powder having a length not longer than 10 $\mu$m and a width of around one tenth of the length is preferred. Co component may be incorporated when producing the acicular iron powder.

Mixing ratios of the alloy powder containing iron, the rare earth element metal and boron to the acicular iron powder is preferably 90–10 weight % of the alloy powder containing iron, the rare earth element metal and boron to 10–90 weight % of the acicular iron powder, and 90–50 weight % of the alloy powder to 10–50 weight % of the acicular iron powder can specifically exhibit enhanced magnetic properties due to synergetic effects (see Table 2 and Figures attached).

Sintering of the powder mixture is carried out in vacuum or in a non-oxidative gas to avoid oxidation of the powder mixture. The temperature for sintering the powder mixture is preferably 900–1200° C. The sintered mass is pulverized under such non-oxidative atmosphere as vacuum, in a non-oxidative gas or in an inert medium.

The present invention will be described in detail hereunder by reference to Examples, however, the invention shall never be restricted to the Examples.

EXAMPLES AND COMPARATIVE EXAMPLES

Each alloy powder (average particle size was smaller than 1 $\mu$m) A and B mentioned in Table 1 was mixed with an acicular iron powder having 0.2 $\mu$m length and 0.02 $\mu$m width to obtain mixtures containing 10, 20, 30, 40, 50, 70 and 90 weight % of the acicular iron powder. The powdery mixture was sintered at 1000° C. in vacuum ($10^{-6}$ Torr), and the resulting sintered mass was pulverized to obtain the raw material powder. The resulting raw material powder (Example), each of the alloy powder A and B itself (Comparative Example) and the acicular iron powder itself (Comparative Example) were subjected to molding under 3 t/cm$^2$ pressure and 10 KOe magnetic field followed by sintering for 1 hour at 1000° C. in vacuum and aging, and permanent magnets were obtained. For those resulting permanent magnets were measured the Maximum Energy Product (BHmax), Residual Flux Density (Br) and Coercive Force (iHc). The result of measurement is shown in Table 2 and FIGS. 1–2 ($\square$:Br, $\Delta$:iHc, $\circ$: BHmax).

TABLE 1

|    | Composition of alloy powder (weight %) | |
|----|------|------|
|    | A    | B    |
| Fe | 52.0 | 84.3 |
| Nd | 28.0 | 8.7  |
| Pr | 4.0  |      |
| B  | 1.0  | 0.7  |
| Cu |      | 0.1  |
| V  |      | 0.3  |
| Co | 15.0 | 5.8  |

TABLE 1-continued

| | Composition of alloy powder (weight %) | |
|---|---|---|
| | A | B |
| Ni | | 0.1 |
| Total | 100.0 | 100.0 |

Figure 2:
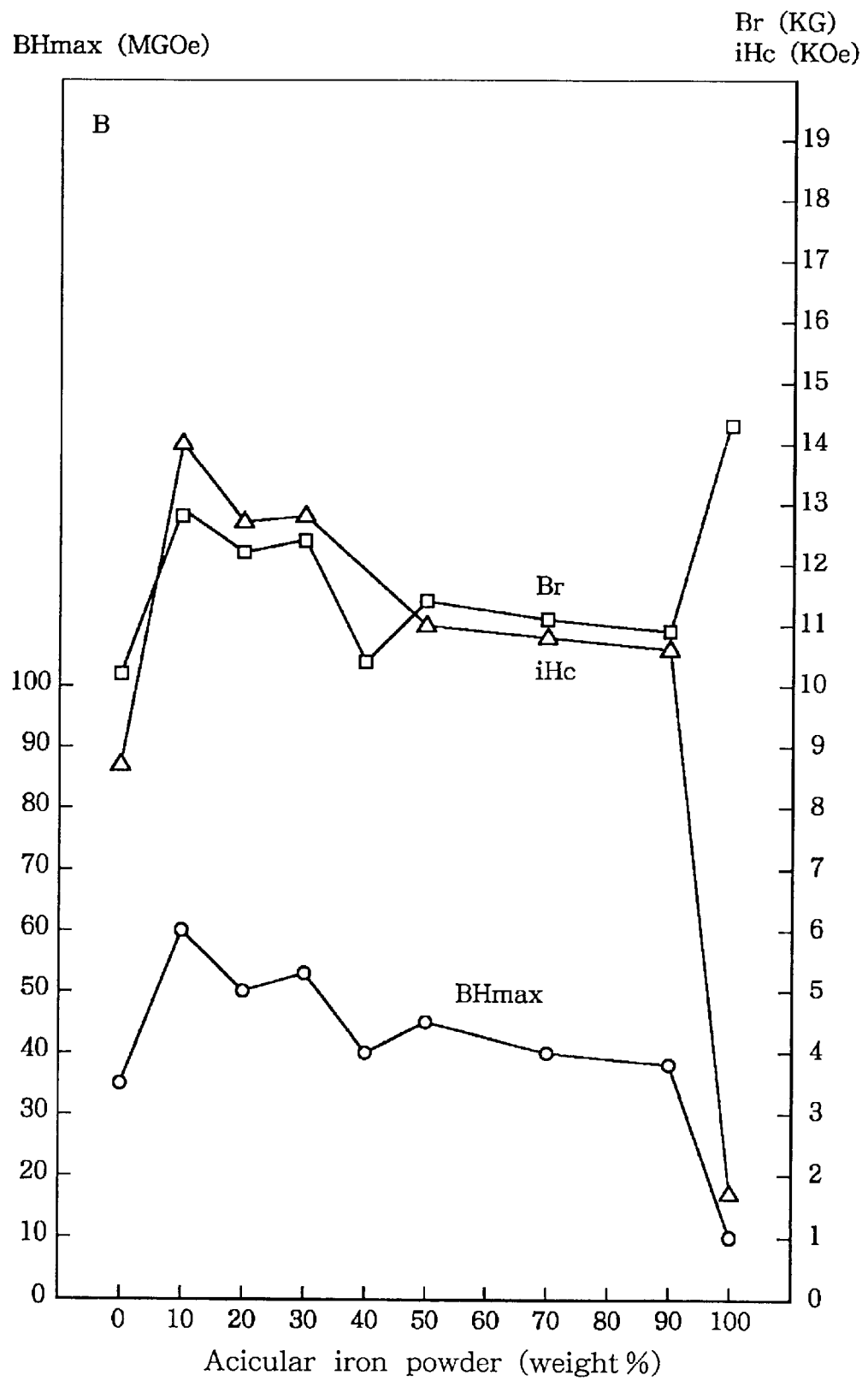
FIG. 2 is a graph showing magnetic properties of a sintered magnet prepared from a pulverized powder of sintered mass obtained by sintering a mixture of alloy powder B and an acicular iron powder.

As understandable from Table 2 and FIGS. 1–2, the sintered magnet made from the raw material powder for modified permanent magnets according to the invention, which raw material powder is prepared by pulverizing sintered mass of the acicular iron powder and the alloy powder A or B can exhibit more superior magnetic properties than sintered magnets made singly from each of the alloy powder A or B (Comparative Examples) or from the acicular iron powder (Comparative Example).

It is possible to obtain a raw material powder for modified permanent magnets exhibiting improved magnetic properties than those made singly from a raw material powder composed of an alloy powder containing iron and rare earth element metals. Further, the invention decreases the amount of the expensive alloy containing rare earth element metals to result in a reduced production cost.

TABLE 2

| weight % Acicular | | | Alloy powder | |
|---|---|---|---|---|
| Iron | Properties | | A | B |
| 0 | Br | (KG) | 12.01 | 10.35 |
| Comparative | iHc | (KOe) | 9.13 | 8.73 |
| Example | BHmax | (MGOe) | 40 | 35 |
| 10 | Br | (KG) | 17.77 | 12.98 |
| Example | iHc | (KOe) | 10.13 | 13.87 |
| | BHmax | (MGOe) | 60 | 60 |
| 20 | Br | (KG) | 17.90 | 12.09 |
| Example | iHc | (KOe) | 11.02 | 12.65 |
| | BHmax | (MGOe) | 63 | 51 |
| 30 | Br | (KG) | 17.79 | 12.39 |
| Example | iHc | (KOe) | 10.98 | 12.83 |
| | BHmax | (MGOe) | 61 | 53 |
| 40 | Br | (KG) | 18.00 | 10.75 |
| Example | iHc | (KOe) | 11.05 | 10.76 |
| | BHmax | (MGOe) | 63 | 40 |
| 50 | Br | (KG) | 18.47 | 11.86 |
| Example | iHc | (KOe) | 11.54 | 11.00 |
| | BHmax | (MGOe) | 65 | 45 |
| 70 | Br | (KG) | 16.19 | 11.10 |
| Example | iHc | (KOe) | 9.27 | 10.81 |
| | BHmax | (MGOe) | 50 | 40 |
| 90 | Br | (KG) | 14.77 | 10.91 |
| Example | iHc | (KOe) | 8.13 | 10.72 |
| | BHmax | (MGOe) | 40 | 39 |
| 100 | Br | (KG) | 14.40 | |
| Comparative | iHc | (KOe) | 1.65 | |
| Example | BHmax | (MGOe) | 9.5 | |

What is claimed is:

1. A process of producing a raw material powder for modified permanent magnets, wherein said process comprises steps of mixing 90–50 weight % of an alloy powder containing iron, neodymium and boron with 10–50 weight % of an acicular iron powder; sintering the resulting powdery mixture in vacuum or in a non-oxidative gas; and pulverizing the resulting sintered mass.

2. A process of producing a raw material powder for modified permanent magnets according to claim 1, in which said step of sintering the powdery mixture of an alloy powder containing iron, neodymium and boron mixed with an acicular iron powder is carried out at 900–1200° C.

3. A process of producing a raw material powder for modified permanent magnets according to claim 1, in which said acicular iron powder is obtained by reducing FeOOH (goethite) acicular crystal in a heated hydrogen-containing gas.

* * * * *